(12) United States Patent
Webster et al.

(10) Patent No.: US 9,593,258 B2
(45) Date of Patent: Mar. 14, 2017

(54) MODIFIED GLYCIDYL CARBAMATE RESINS

(71) Applicant: NDSU RESEARCH FOUNDATION, Fargo, ND (US)

(72) Inventors: Dean C. Webster, Fargo, ND (US);
Umesh Harkal, Fargo, ND (US);
James Garrett, Gordonsville, PA (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 161 days.

(21) Appl. No.: 14/633,434

(22) Filed: Feb. 27, 2015

(65) Prior Publication Data

US 2015/0307739 A1    Oct. 29, 2015

Related U.S. Application Data

(62) Division of application No. 12/680,401, filed as application No. PCT/US2008/078112 on Sep. 29, 2008, now Pat. No. 9,051,413.

(Continued)

(51) Int. Cl.
| | |
|---|---|
| *D21H 21/16* | (2006.01) |
| *D21H 17/07* | (2006.01) |
| *C08J 5/12* | (2006.01) |
| *C09D 175/04* | (2006.01) |
| *C08G 18/28* | (2006.01) |
| *C08G 18/78* | (2006.01) |
| *C08G 59/32* | (2006.01) |
| *C08G 59/50* | (2006.01) |

(Continued)

(52) U.S. Cl.
CPC ....... *C09D 175/04* (2013.01); *C08G 18/2845* (2013.01); *C08G 18/30* (2013.01); *C08G 18/7831* (2013.01); *C08G 59/3236* (2013.01); *C08G 59/5026* (2013.01); *C08G 65/3322* (2013.01); *C08G 65/33327* (2013.01); *C09D 163/00* (2013.01)

(58) Field of Classification Search
USPC .............................. 106/287.2, 287.25, 287.3
See application file for complete search history.

(56) References Cited

U.S. PATENT DOCUMENTS

| | | |
|---|---|---|
| 4,397,993 A | 8/1983 | Tefertiller et al. |
| 4,950,722 A | 8/1990 | Parker |

(Continued)

FOREIGN PATENT DOCUMENTS

| | | |
|---|---|---|
| WO | 99/03905 A1 | 1/1999 |
| WO | 02/31021 A1 | 4/2002 |

(Continued)

OTHER PUBLICATIONS

Chen et al., "Preparation and Characterization of Cryogenic Adhesives. I. Glycidyl-Terminated Polyurethane Resins," J. Applied Polymer Science 51:1199-1206 (1994).

(Continued)

*Primary Examiner* — James McDonough
(74) *Attorney, Agent, or Firm* — J. A. Lindeman & Co., PLLC

(57) ABSTRACT

The invention relates to alcohol-modified glycidyl carbamate resins wherein at least some of the glycidol groups in the resin have been replaced with an alcohol. The invention also relates to coating compositions containing the resins.

15 Claims, 4 Drawing Sheets

Related U.S. Application Data

(60) Provisional application No. 60/976,072, filed on Sep. 28, 2007.

(51) Int. Cl.
*C08G 65/332* (2006.01)
*C08G 65/333* (2006.01)
*C09D 163/00* (2006.01)
*C08G 18/30* (2006.01)

(56) References Cited

U.S. PATENT DOCUMENTS

| | | | |
|---|---|---|---|
| 5,043,381 A * | 8/1991 | Coogan | C08G 18/0866 |
| | | | 524/591 |
| 6,100,326 A * | 8/2000 | Richter | C08G 18/706 |
| | | | 524/591 |
| 6,172,159 B1 * | 1/2001 | Gaal, Jr. | C08G 18/4202 |
| | | | 524/539 |
| 7,776,956 B2 * | 8/2010 | Webster | C08G 18/2845 |
| | | | 524/591 |
| 2002/0103319 A1 | 8/2002 | Ohrbom et al. | |
| 2010/0319580 A1 | 12/2010 | Webster et al. | |
| 2011/0263753 A1 | 10/2011 | Harkal et al. | |

FOREIGN PATENT DOCUMENTS

| | | |
|---|---|---|
| WO | 03/060026 A1 | 7/2003 |
| WO | 2009/042999 A1 | 4/2009 |

OTHER PUBLICATIONS

Edwards et al., "Synthesis and Characterization of Glycidyl Carbamate Functional Oligomers," Polymer Preprints 44(1):144-145 (2003).
Edwards et al., "Kinetics and Cure of Glycidyl Carbamate Functional Oligomers," Polymeric Materials: Science and Engineering 90:455-456 (2004).
Edwards et al., "Cure Properties of Glycidyl Carbamate Functional Oligomers Reacted with Amines," Polymer Preprints 45(1):935-936 (2004).
Edwards et al., "Synthesis, characterization and self-crosslinking of glycidyl carbamate functional resins," Prog. Org. Coat. 57:128-139 (2006).
Farissey et al., "The Rearrangement of Glycidyl N-Phenylcarbamate," Journal of Heterocyclic Chemistry 7:331-333 (1970).
International Search Report for PCT/US2008/078112 dated Dec. 24, 2008.
International Preliminary Report on Patentability of PCT/US2008/078112 dated Mar. 30, 2010.
Bayhydur XP 7165: Water Dispersible Polyisocyanate, Product Information, Sep. 2002.
Hsia et al., "Glycidyl-Terminated Polyurethane Modified Epoxy Resins: Mechanical Properties, adhesion Properties and Morphology," Journal of Applied Polymer Science 52:1137-1151 (1994).
Edwards et al., "Novel Polyurethane Coating Technology Through Glycidyl Carbamate Chemistry," JCT Research 2(7):517-527 (2005).
Edwards et al., "Synthesis and Self-Crosslinking of Glycidyl Carbamate Functional Oligomers," Polymer Preprints. 44 (1):54 (2003).
Dieterich, "Die Angewandte Makromolekulare Chemie," pp. 133-165 (1981).
Kim et al., "Waterborne Polyurethanes and Their Properties," Journal of Polymer Science: Part A: Polymer Chemistry 34:1095-1104 (1996).
Dvorchak et al., "A New Water Reducible Blocked Polyisocyanate (NWRBP) for One Component (1K) Polyurethane Coatings," Proceedings of the International Waterborne, High-Solids, and Powder Coatings Symposium, pp. 405-419 (2000).
Escarsega et al., "Water-Reducible PUR Coatings for Military Applications," Modem Paint and Coatings, pp. 21-30 (1997).
Grunlan et al., "Waterborne Coatings with an Emphasis on Synthetic Aspects: An Overview," American Chemical Society Symposium Series, pp. 1-26 (1997).
Hartz, "Reaction During Cure of a Blocked Isocyanate-Epoxy Resin Adhesive," Journal of Applied Polymer Science 19:735-746 (1975).
Page et al., "Polyester Resins in Water-Based Urethanes," Paint & Ink International 9(2):37-40 (1996).
Dvorchak et al., "Water-Reducible Unsaturated Polyester Polymers as Binder for UV-Curable Furniture Coatings," Proceedings of the Waterborne, High-Solids, and Powder Coatings Symposium, pp. 253-267 (1989).
Wang et al., "Synthesis and Characterization of UV-Curable Waterborne Polyurethane-Acrylate Ionomers for Coatings," Journal of Applied Polymer Science 73:2869-2876 (1999).
Yang et al., "Chain-extended UV-Curable Waterborne Polyurethane-Acrylate," Gaofenzi Cailiao Kexue Yu Gongcheng 19(2):199-202 (2003) (with English Abstract).
Jang et al., "Effect of Process Variables on Molecular Weight and mechanical Properties of War-Based Polyurethane Dispersion," Colloids and Surfaces, A: Physicochemical and Engineering Aspects 196:135-143 (2002).
Gündüz et al., "Structure-Property Study of Waterborne Polyurethane Coatings with Different Hydrophilic Contents and Polyols," Journal of Dispersion Science and Technology 25(2):217-228 (2004).
Jinqing et al., "Synthesis of High Solid Content Waterborne Polyurethane Dispersion," Huagong Xuebao 54(6):868-871 (2003) (with English Abstract).
Song et al, "Effect of PEG Molecular Weight in Hydrophilic Segment on the Crystallization of Cast Film of Waterborne Polyurethane," Xiamen Daxue Xuebao, Ziran Kexueban 41(4):463-467 (2002) (with English Abstract).
Webb, "Urethane Systems Reactivity Measurement," Journal of Cellular Plastics, pp. 208-212 (1985).
Illger et al., "Reaction Kinetics Study of High Resilient Polyurethane Foams," Polyurethanes World Congress, pp. 305-310 (1987).
Office Action of U.S. Appl. No. 11/882,754 dated Jun. 24, 2009.
Office Action of U.S. Appl. No. 11/882,754 dated Dec. 3, 2008.
Office Action of U.S. Appl. No. 12/840,019 dated Apr. 3, 2012.
Office Action of U.S. Appl. No. 12/840,019 dated Nov. 16, 2011.

* cited by examiner

MODIFIED GLYCIDYL CARBAMATE RESINS

GOVERNMENT SUPPORT

This invention was supported by the Department of the Navy under Grant number 861-NVY-2S/NDSU Prime: N00024-05-C-4139. The government has certain rights in this invention.

FIELD OF THE INVENTION

The invention relates to glycidyl carbamate (GC) resins that have been modified to substitute at least some of the glycidyl groups with alcohol-derived groups. The modified GC resins may be crosslinked and used in coatings.

BACKGROUND

The synthesis of the glycidyl carbamate functional group by the reaction of an isocyanate functional compound and glycidol is known to those skilled in the art.

Farissey and Nashu (Journal of Heterocyclic Chemistry, 1970, 7, 331-333) disclose the synthesis of a glycidyl carbamate model compound and the intramolecular rearrangement reaction at elevated temperatures to a hydroxyoxazoline.

U.S. Pat. No. 4,397,993 discloses oxirane-containing polyurethane polymers where the oxirane is part of a glycidyl carbamate group. Crosslinking of the polymer is effected by reaction of the polymer with an epoxy crosslinking agent which can be a polyol or polyamine. This patent also discloses a "self-crosslinkable" polymer, however the self-crosslinkable polymer incorporates unreacted isocyanate groups.

U.S. Pat. No. 4,950,722 discloses the synthesis of an unsaturated epoxy that contains carbamate functionality. Mixtures of this compound with conventional epoxy resins as well as the vinyl copolymerization with other unsaturated monomers was described.

Chen et al. (J. Applied Polymer Science, 51, 1199 (1994); J. Applied Polymer Science, 52, 1137 (1994)) discloses the preparation of glycidyl-terminated polyurethane resins. Polyamines were used to crosslink the polymers. Blends of the glycidyl-terminated polyurethane resins with conventional epoxy resins were also prepared and crosslinked with polyamines.

Edwards, et al. (Polymer Preprints, 44(1), 144 (2003); Polymer Preprints, 44(1), 54 (2003); Polymeric Materials: Science and Engineering, 90, 455 (2004); Prog. Org. Coat., 57, 128-139 (2006)) discloses the synthesis of multifunctional glycidyl carbamate functional oligomers from polyfunctional isocyanates and glycidol. The self-crosslinking reaction to form coatings with good performance was also described.

Edwards, et al. (Polymer Preprints, 45(1), 935 (2004); JCT Research 2(7), 517-528 (2005)) described the crosslinking of the multifunctional glycidyl carbamate functional oligomers with polyfunctional amines to form hard and flexible coatings having good solvent resistance.

The glycidyl carbamate resins described by Edwards, et al. are the reaction products of multifunctional isocyanates with glycidol. Two such resins are illustrated below and are based on the hexamethylene diisocyanate triisocyanurate trimer (IGC) and biuret trimer (BGC), respectively.

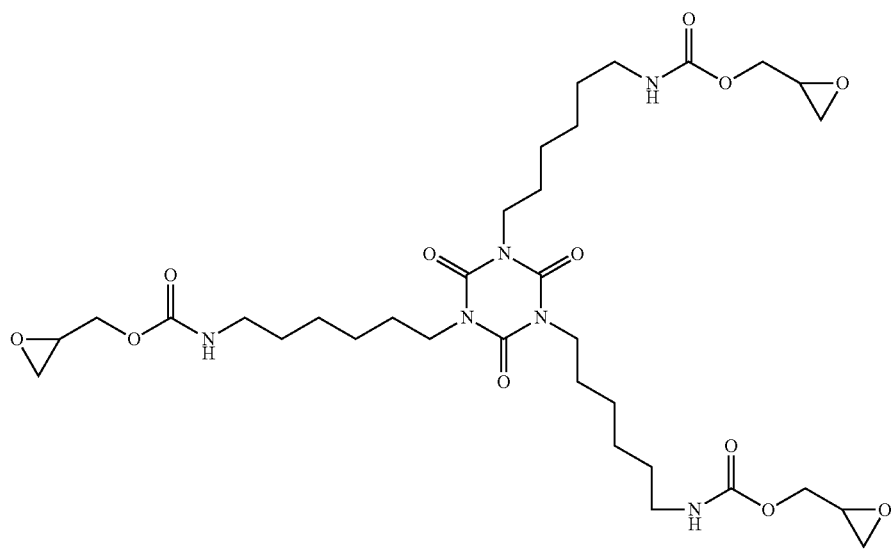

IGC

-continued

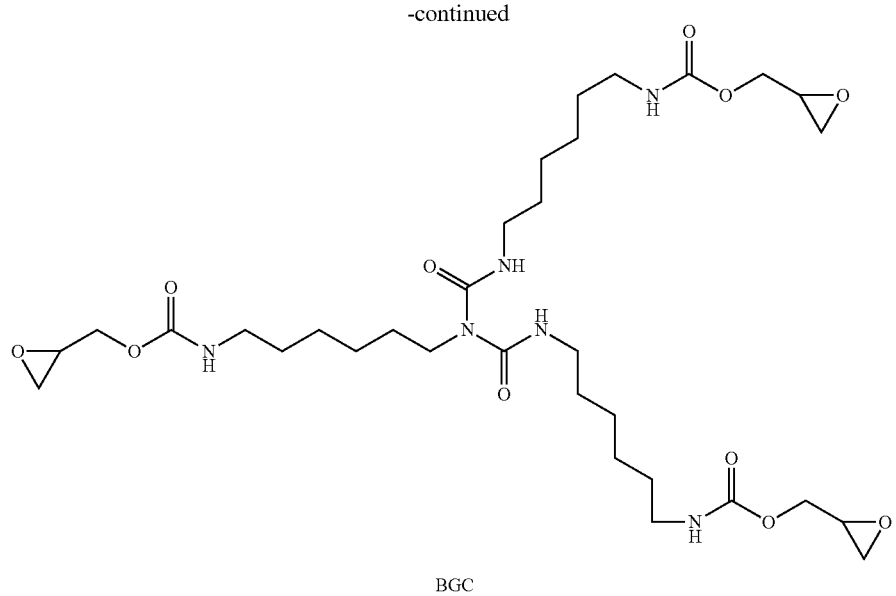

BGC

These resins can be self-crosslinked or crosslinked with amines to produce coatings. However, the resins have very high viscosity and a large amount of solvent is needed to make coatings, especially coatings that can be applied using spray, brush, or roller application methods.

Thus, what is needed in the art is a way of reducing the viscosity while maintaining the reactivity and good properties of these glycidyl carbamate functional resins. This invention answers that need.

SUMMARY OF THE INVENTION

The invention relates to alcohol-modified carbamate functional (GC) compounds of formula (I), (II), (III), or (IV). Coating compositions may contain one or more of these GC-functional resins, other GC-functional compounds, a curing agent, and an organic solvent. The alcohol-modified GC compounds of formulas (I)-(IV) where the variable n is 0 are themselves a separate embodiment of the invention. The invention provides methods for making a solvent-based coating composition and methods of coating substrates with a solvent-based coating composition of the invention.

The invention also relates to a method of making an alcohol-modified glycidyl carbamate resin containing glycidyl carbamate functional compounds, comprising the step of substituting about 5% to about 45% of the glycidyl groups in the glycidyl carbamate functional compounds with an alcohol. In a separate embodiment, the GC-functional resin is a reaction product of an isocyanate having at least three isocyanate groups, glycidol, and an alcohol, where the equivalent ratio of glycidol to alcohol ranges from 1:2 to 49:1.

DETAILED DESCRIPTION OF THE INVENTION

Figure 1:
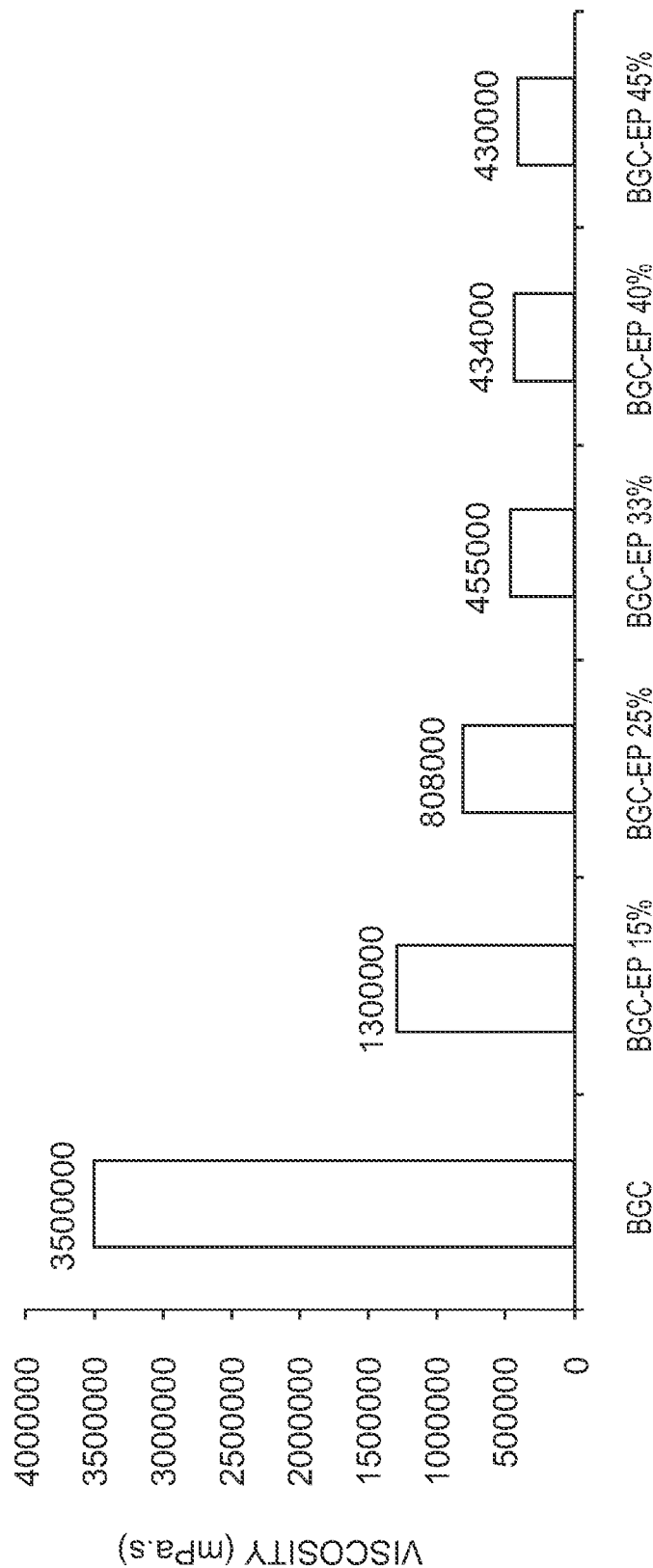
FIG. 1 is a chart depicting the viscosity of various glycidyl carbamate resins.

The invention relates to coating compositions which contain an alcohol-modified GC compound of any of formulas (I)-(IV), optionally other GC-functional compounds, optionally a curing agent, and optionally an organic solvent. The alcohol-modified GC compounds of each of formulas (I)-(IV) are themselves separate embodiments of the invention.

The alcohol-modified GC compounds useful in the invention can be described by the following general formulas (I), (II), (III), and (IV):

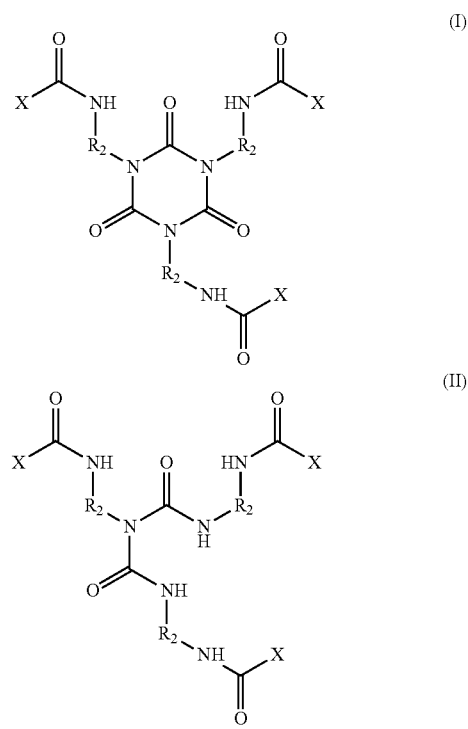

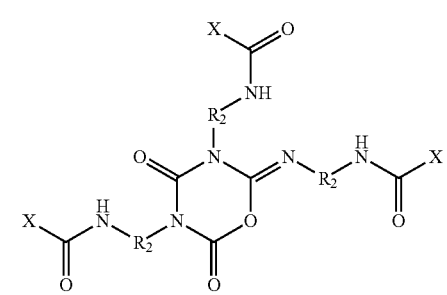

(III)

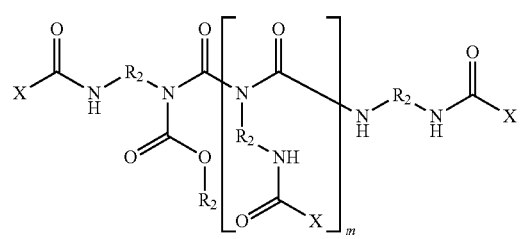

(IV)

Formula (I) is representative of a triisocyanate glycidyl carbamate functional compound; formula (II) is representative of a biuret glycidyl carbamate functional compound; formula (III) is representative of an iminooxadiazine dione compound; and formula (IV) is representative of a multifunctional allophanate compound.

X represents either the glycidyl group:

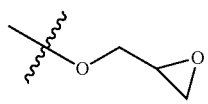 [SMILES: *OCC1CO1]

or an alkyl group derived from an alcohol, represented by:

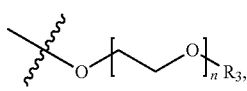

wherein at least two of the X moieties in each compound are represented by the glycidyl group.

For the alcohol-modified GC compounds of formulas (I)-(IV), n may range from 0 to 50 and preferably ranges from 0 to 10, and more preferably from 0 to 5. In certain embodiments, n ranges from 1-5, and in other embodiments, n is 0. When n is other than 0, the modifying alcohol group is an ether alcohol group containing one or more ethyleneoxy groups. GC-functional compounds of formulas (I)-(IV) where n is 0 represent a separate embodiment of the invention.

$R_2$ is independently an optionally substituted, divalent $C_1$-$C_{15}$ alkyl, optionally substituted divalent $C_3$-$C_{15}$ cycloalkyl, or a group selected from

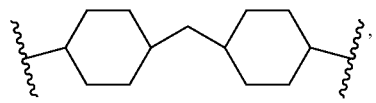

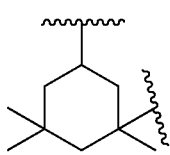

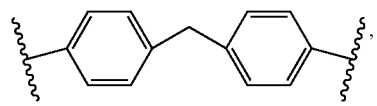

and

Preferably, $R_2$ is a divalent $C_1$-$C_{15}$ alkyl, more preferably a $C_3$-$C_{10}$ alkyl, even more preferably a $C_3$-$C_8$ alkyl, and most preferably —$(CH_2)_6$—. $R_3$ is independently an optionally substituted $C_1$-$C_{22}$ alkyl, preferably a $C_1$-$C_{15}$ alkyl. For embodiments of the invention where n is 1 or more, $R_3$ is preferably $C_1$-$C_6$, and more preferably $C_1$-$C_3$. For embodiments of the invention where n is 0, $R_3$ is preferably $C_3$-$C_{10}$, more preferably a $C_4$-$C_8$ alkyl, and most preferably a n-butyl, iso-butyl, or a 2-ethylhexyl group.

In formula (IV), the variable m ranges from 1-15, preferably 1-7, and most preferably 1-4. This includes trifunctional allophanate resins (where m=1) and tetrafunctional allophanate resins (where m=2).

Preferred compounds include those represented by formulas (Ia) and (IIa):

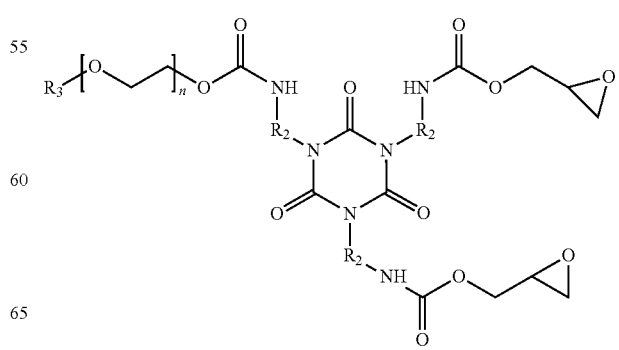

(Ia)

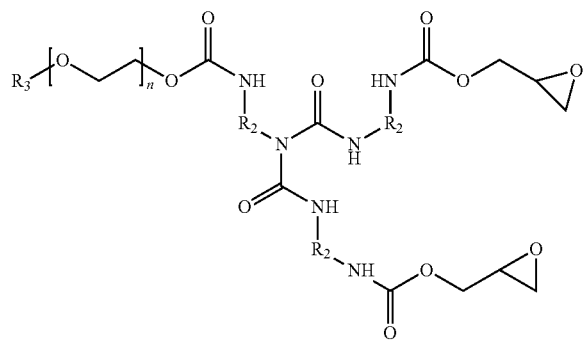

The term "alkyl" includes straight and branched alkyl groups. As indicated above, $R_2$ and $R_3$ may be substituted with any number of substituents or functional moieties. Examples of substituents include, but are not limited to, halo substituents, e.g. F; Cl; Br; or I; a hydroxyl group; a $C_1$-$C_6$ alkoxy group, e.g., —$OCH_3$, —$OCH_2CH_3$, or —$OCH(CH_3)_2$; a $C_1$-$C_6$ haloalkyl group, e.g., —$CF_3$; —$CH_2CF_3$; or —$CHCl_2$; $C_1$-$C_6$ alkylthio; amino; mono and dialkyl amino groups; —$NO_2$; —CN; a sulfate group, and the like.

Another embodiment of the invention relates to a glycidyl carbamate functional resin that is the reaction product of an isocyanate having at least three isocyanate groups per molecule, glycidol, and an alcohol. In certain compounds, all the isocyanate groups will react with the glycidol to form glycidyl carbamate functional compounds. In other compounds, one or more isocyanate groups will react with the alcohol to form an alcohol-modified glycidyl carbamate compound. The glycidyl carbamate functional resin may contain both glycidyl carbamate functional compounds and alcohol-modified glycidyl carbamate compounds. The percentage of isocyanate groups reacting with the alcohol depends, at least partially, on the ratio of glydicol to alcohol used.

The equivalent ratio of glycidol to alcohol may range from 1:2 to 59:1, preferably 1:2 to 49:1, more preferably 1:2 to 29:1, even more preferably from about 1:1 to about 3:1, and most preferably the equivalent ratio is approximately 2:1. The equivalent ratio may be varied by adjusting the stoichiometric ratio of the reactants used to prepare the resins.

Resins containing alcohol-modified GC compounds have a lower viscosity than resins prepared where glycidol is the only reagent used. Formulated in solvent-based coating compositions, these resins can be crosslinked with multi-functional amines or self-crosslinked at elevated temperatures. The pendent glycidol groups are especially effective at promoting crosslinking.

The invention also relates to a method of making an alcohol-modified glycidyl carbamate resin containing glycidyl carbamate functional compounds, comprising the step of substituting about 5% to about 45% of the glycidyl groups in the glycidyl carbamate functional compounds with an alcohol. Preferred ranges include about 16% (⅙) to about 45%, about 33% to about 45%, and about 16% to about 33%. The percentages are molar percentages, based on the amount of glycidyl groups that have been substituted with an alcohol.

The resin may contain both alcohol-modified glycidyl carbamate compounds and other GC-functional compounds that have not been reacted with the alcohol. For instance, the glycidol groups of certain GC-functional compounds may not react with the alcohol because the amount of alcohol used was sufficiently low. Alternatively, the resin may contain multiple batches of GC-functional compounds, some of which contain glycidyl groups that have been reacted with alcohol groups, and some of which contain glycidyl groups, none of which have been reacted with an alcohol.

The GC-functional compound may be a biuret glycidyl carbamate functional compound, a triisocyanurate glycidyl carbamate functional compound, an iminooxadiazine dione compound, a multi-functional allophanate compound (such as a trifunctional or tetrafunctional allophanate resin) having at least three pendent glycidyl carbamate groups, or combinations thereof. Other resins having at least three glycidyl carbamate groups, such as a GC resins made from polymeric MDI, may also be suitable.

Preferred Alcohol-Modified BGC Resins

One preferred group of alcohol-modified GC resins are alcohol-modified BGC resins, resins of formula (II) where n is 0. Replacing a portion of the glycidol in the structure of the resins provides resins having lower viscosity as well as good properties when crosslinked materials are produced. Two sets of alcohol modified resins have been prepared. First a set of three BGC-functional resins were made where approximately ⅓ of the glycidol was replaced by either n-butanol, iso-butanol, or 2-ethylhexanol. Examples of these are illustrated below.

BGC-BA

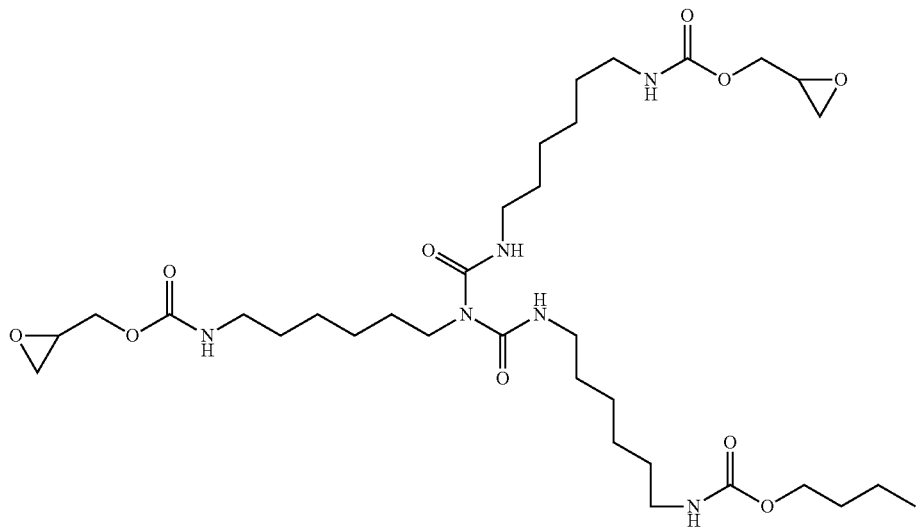

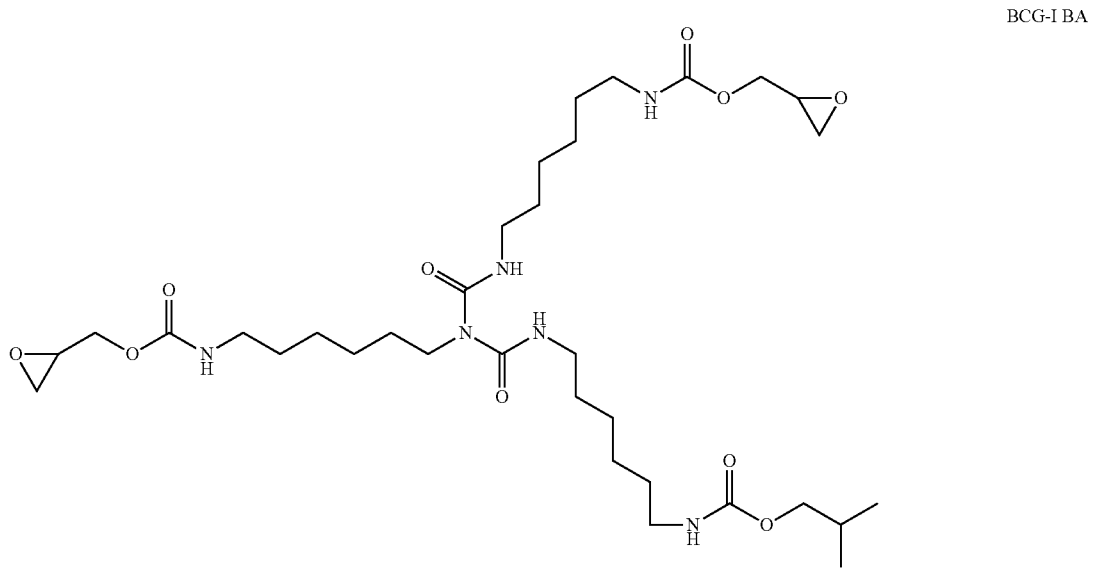

BCG-IBA

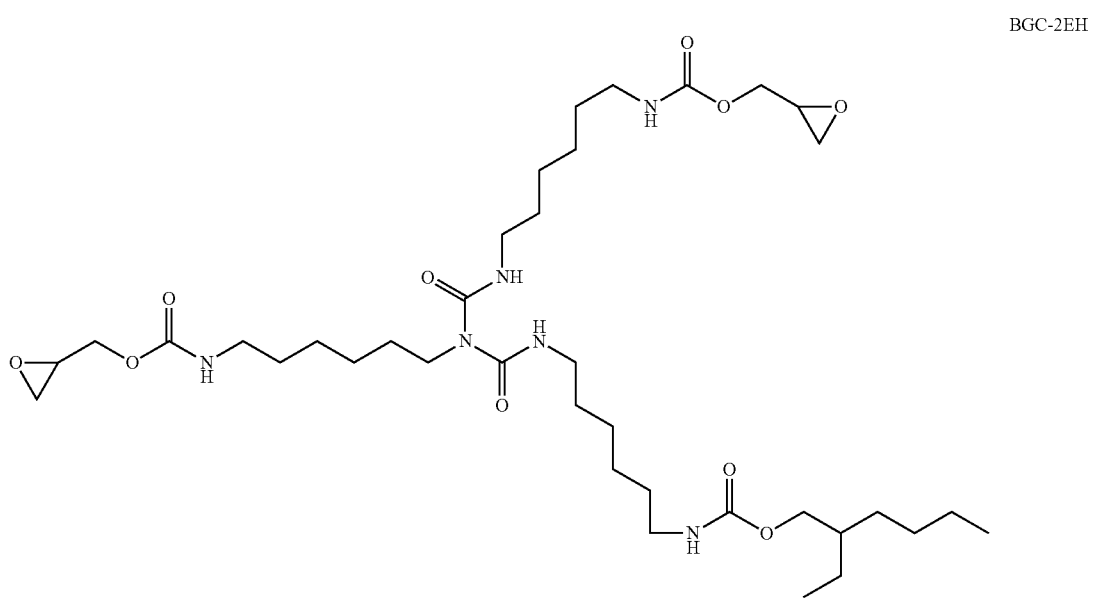

BGC-2EH

The viscosity of the resins as-made (without solvent) as well as reduced to 80% with t-butyl acetate (t-BAc) was measured and is shown in Table 1. The viscosities of the alcohol-modified resins are substantially lower than the control BGC resin.

Preferred Ether Alcohol Modified BGC Resins

Another preferred group of alcohol-modified GC resins are alcohol-modified BGC resins, resins of formula (II) where n is 1 or greater. Preferably, n is 1, 2 or 3. This second set of resins was synthesized using ether alcohols as the modifying alcohol. Resins were prepared replacing approximately ⅓ of the glycidol with ethylene glycol butyl ether (EB), ethylene glycol propyl ether (EP), or diethylene glycol butyl ether (DB). The structures are illustrated below.

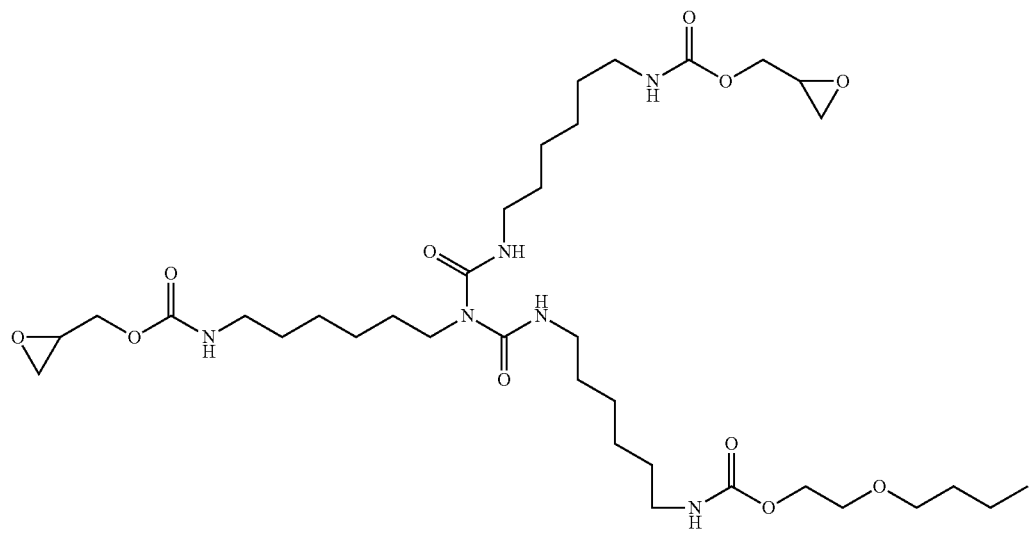
BGC-EB
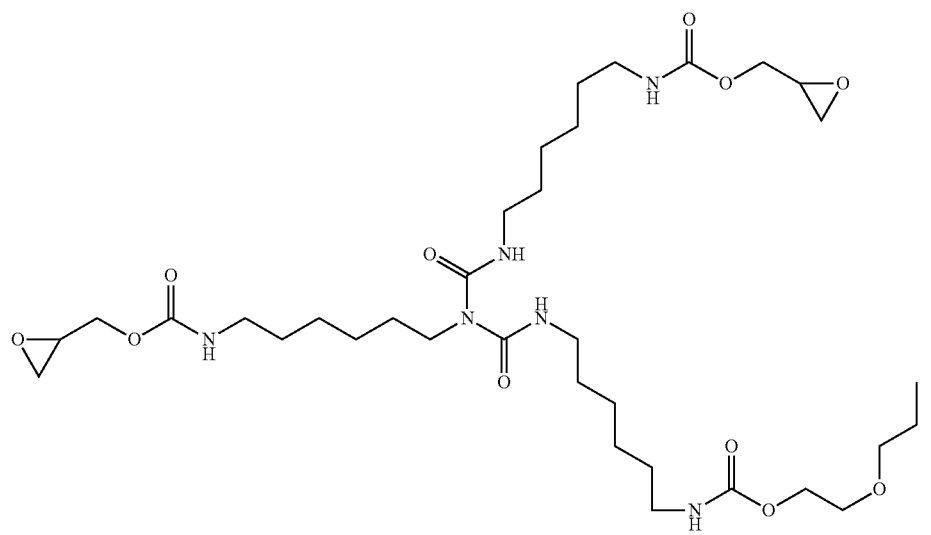
BGC-EP
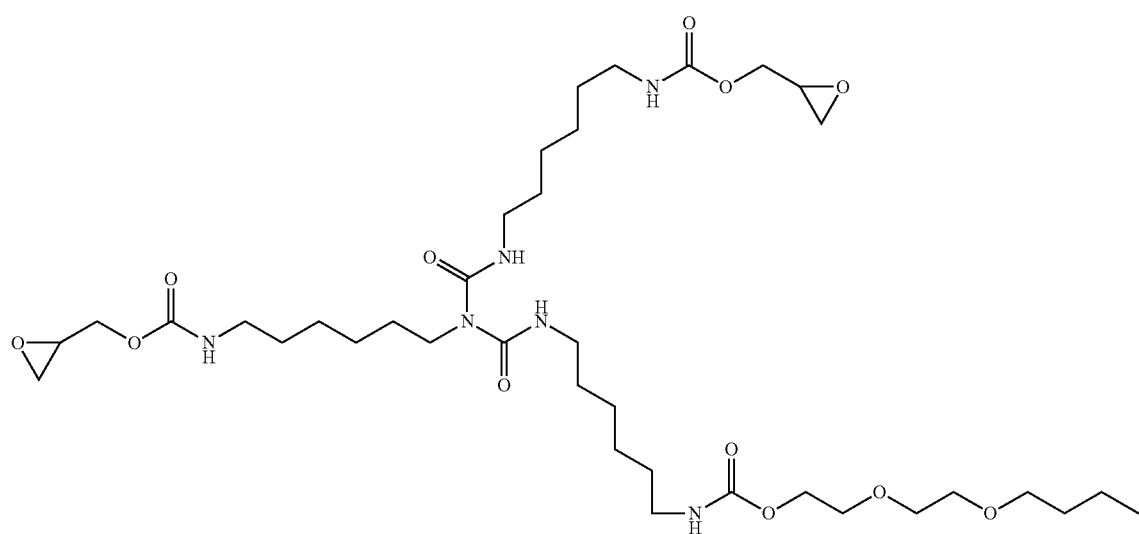
BGC-DB

The viscosity of the resins was determined as-made (~100% solids) and after reducing to 80% solids with t-butyl acetate (t-BAc). The data in Table 6 shows that the viscosity of the ether alcohol modified resins is significantly lower than the control resin.

Coating Compositions of the Invention

As discussed above, the invention also relates to solvent-based coating compositions comprising an alcohol-modified GC compound of formula (I)-(IV), an optional curing agent, and an optional organic solvent. The coating compositions of the invention may be self-crosslinking. One embodiment of the invention is 100% solids coating composition, with or with out a curing agent. For solvent-based coatings, the alcohol-modified GC resin containing one or more GC-functional compounds of formulas (I)-(IV) are generally present in a coating composition of the invention in the amount of about 30—about 80 weight percent solids and preferably about 60—about 70 weight percent solids. The curing agent, when present, may be used in the manner and amount known in the art. For example, the curing agent is present in the amount of about 1 weight percent to about 30 weight percent and preferably about 15 to 25 weight percent.

The curing agent serves to crosslink the resultant epoxy urethane coating formed using a solvent-based coating composition of the invention. The curing agent may be any curing agent known in the art to cure (or crosslink) epoxy resins. Suitable curing agents for use with the compositions of the inventions include those typically employed with epoxy resins, such as aliphatic, araliphatic and aromatic amines, polyamides, amidoamines and epoxy-amine adducts. The coating may be cured at ambient or elevated (e.g. about 80° C.) temperatures. Amine curing agents typically allow the coating to cure at ambient temperatures.

Suitable amine curing agents are those which are soluble or at least dispersible in a coating composition of the invention. Amine curing agents known in the art include, for example, diethylenetriamine, triethylenetetramine, tetraethylene-pentamine, etc. as well as 4,4'-methylene dianiline, 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N''-bis(3-aminopropyl)butane-1,4-diamine; 1-ethyl-1,3-propanediamine; 2,2(4),4-trimethyl-1,6-hexanediamin; bis(3-aminopropyl)piperazine; N-aminoethylpiperazine; N,N-bis(3-aminopropyl)ethylenediamine; 2,4(6)-toluenediamine; dicyandiamine; melamine formaldehyde; tetraethylenepentamine; 3-diethylaminopropylamine; 3,3''-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl)cyclohexane; and 1-cyclohexyl-3,4-dimino-cyclohexane. Exemplary araliphatic amines, in particular those amines in which the amino groups are present on the aliphatic radical, include, for example, m- and p-xylylenediamine and its hydrogenation products as well as diamide diphenylmethane; diamide diphenylsulfonic acid (amine adduct); 4,4''-methylenedianiline; 2,4-bis (p-aminobenzyl)aniline; diethyltoluenediamine; and m-phenylene diamine. The amine curing agents may be used alone or as mixtures.

Preferred amine curing agents used with the coating compositions of the invention include PACM (bis(para-aminocyclohexyl)methane), and polyamides such as Ancamide 2353. Stoichiometry ratios of amine to oxirane of the coating compositions may be based on amine hydrogen equivalent weight (AHEW) and on weight per epoxide (WPE).

Suitable amine-epoxide adducts include, for example, reaction products of diamines, such as ethylenediamine, diethylenetriamine, triethylenetetramine, m-xylylenediamine and/or bis(aminomethyl)cyclohexane with terminal epoxides, such as the polyglycidyl ethers of the polyhydric phenols listed above.

Polyamide resins can also serve as curing agents for the resins. Suitable polyamide reins include those prepared through the reaction product of multifunctional amines with diacids. Dimer fatty acids are the most commonly used diacids for the synthesis of polyamide resins.

Examples of solvents that may be used include, but are not limited to, mixed xylenes, toluene, Aromatic 100, Aromatic 150, acetone, methyl ethyl ketone, methyl amyl ketone, methyl isobutyl ketone, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL™ ester alcohol (supplied by Eastman Chemical Company), ethyl 3-ethoxy propionate (EEP) and tertiary butyl acetate (TBA), and the like, as well as mixtures thereof.

The coating composition may further contain at least one coating additive to, for example, enhance the composition's coating efficiency. Examples of suitable coating additives include, but are not limited to, leveling and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, herein incorporated by reference in its entirety.

Examples of suitable flatting agents include, but are not limited to, synthetic silica, available from the Davison Chemical Division of W. R. Grace & Company, as SYLOID™; polypropylene, available from Hercules Inc., as HERCOFLAT™; synthetic silicate, available from J. M. Huber Corporation, as ZEOLEX™.

Examples of suitable viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the ANTI TERRA™ mark. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

The coating compositions of the invention may be used to form coatings on a substrate. Preferred substrates include wood, steel, aluminum, plastic, and glass. The invention relates to a method of coating such substrates by applying the coating composition to the substrate. The coating may be applied by methods know in the art such as drawdown, conventional air-atomized spray, airless spray, roller, and brush. For those coating compositions containing a crosslinker, the coating may be cured at ambient temperatures or above. Self-crosslinking coating compositions are cured at elevated temperatures, preferably at or above 100° C., and more preferably at or above 150° C., to form thermoset coatings on the particular substrate.

The following examples are given to illustrate the invention. It should be understood, however, that the invention is not to be limited to the specific conditions or details described in these examples.

EXAMPLES

Materials:

Hexamethylene diisocyanate biuret, a biuret resin condensate derived from hexamethylene diisocyanate (Tolonate® HDB-LV), was provided by Rhodia Inc. HDB-LV has an NCO equivalent weight of 175.44 g/eq. Glycidol was supplied by Dixie Chemical Co. and stored refrigerated to minimize formation of impurities. Alcohols used were 2-ethyl hexanol (EHA) (Alfa Aesar), isobutanol (IsoBuOH) (Alfa Aesar) and 1 butanol (1 BuOH, BA) (J. T. Baker), ethylene glycol butyl ether (EB) (Aldrich), diethylene glycol butyl ether (DB) (Aldrich) and ethylene glycol propyl ether (EP) (Fluka-Aldrich).

Dibutyltindilaurate (DBTDL), purchased from Aldrich, was used to catalyze the isocyanate, glycidol and alcohol reactions to form glycidyl carbamate (GC). All the reagents were used as received without any further purification.

Solvents used for the formulations were ethyl 3-ethoxy propionate (EEP) and tertiary butyl acetate (TBA) obtained from Aldrich and Ashland, respectively. The amine crosslinkers, para-aminocyclohexyl methane (PACM) and Ancamide 2353 were provided by Air Products.

Synthesis of Glycidyl Carbamate Functional Compounds

A 500 ml four neck reaction vessel with condenser, nitrogen inlet and Model 210 J-KEM temperature controller, mechanical stirrer and water bath for heating and cooling the vessel was used for resin synthesis. The stoichiometric equivalent amounts used for the synthesis of biuret glycidyl carbamate (BGC) was 1:1 (isocyanate:glycidol) and that for modified BGC was 1:0.66:0.33 (isocyanate:glycidol:alcohol). Thus, overall isocyanate index (NCO/OH) was maintained up to 98 to 101.

For the synthesis of both BGC and alcohol modified BGC, the reaction vessel was charged with HDB-LV followed by glycidol and alcohol or ether alcohol and the reaction mixture was held at 40-45° C. After mixing for 45 to 60 min, 0.03 wt % (of the reaction charge) DBTDL catalyst in tertiary butyl acetate solution (1.2-1.4% wt) was added. Reaction showed a very high exotherm at 40° C. after the addition of DBTDL. After this point, bubbles started to form, the viscosity started to increase and the appearance of the reaction mixture changed from transparent to milky over the entire reaction period. Disappearance of NCO peak was monitored by FTIR and the reaction was continued until the peak disappeared. After the completion of reactions, resins were collected in glass jars.

FTIR Measurements:

FTIR measurements were performed using a Nicolet Magna-850 FTIR spectrometer. Sample aliquots were taken and coated on a potassium bromide salt plate. Spectral acquisitions were based on 64 scans and a data spacing of 1.98 $cm^{-1}$. The FTIR was set for auto gain to monitor spectral ranges of 4000-500 $cm^{-1}$. Monitoring of changing band absorption was used to follow conversion during the reaction using isocyanate (2272 $cm^{-1}$), —OH and —NH (3750 to 3000 $cm^{-1}$), amide (1244 $cm^{-1}$) and epoxide (910 to 815 $cm^{-1}$) bands.

NMR Characterization:

$^{13}$C NMR was done for all of the GC resins using a JEOL (400 MHz) NMR spectrometer coupled with an auto-sampler accessory. The spectra were run at 30° pulse angle, 1.04 sec acquisition time, 2 sec relaxation delay, and at 24° C. with 1000 scans. All the spectra were collected by dissolving 50 to 70 mg samples in 0.7 ml $CDCl_3$. The spectra were analyzed using Delta NMR processing and control software (Version 4.3.5).

Gel Permeation Chromatography:

Gel permeation chromatography (GPC) was conducted using a Waters 515 HPLC solvent pump, Waters 2410 refractive index detector, Waters 717-auto sampler with injection volumes of 200 μl and a flow rate of 1 ml/min. The samples were dissolved in tetrahydrofuran (THF), 1 mg $cm^{-3}$, and filtered with a 0.2 μm PTFE filter. Styragel HR and HT columns were used for high resolution at low- and mid-ranged molecular weights, respectively. Polystyrene standards were used for calibration.

Viscosity Measurements:

Brookfield (HADVE 115 Model) and Brookfield (DV-II+ Pro) instruments were used for viscosity measurements of alcohol modified and ether alcohol modified BGC resins respectively. About 300 g of resin was taken in a 500 ml glass jars. Spindle number 7 was used with an rpm range of 0.5 to 2 rpm. All the readings over a range of 10 min were averaged.

Epoxy Titration:

Epoxy equivalent weights of resins were determined by titration with hydrogen bromide (HBr) according to ASTM D1652. 0.06 to 0.8 g of resin was dissolved in 5-10 ml of chloroform and was titrated against standardized HBr in glacial acetic acid using crystal violate indicator. Weight per epoxy was calculated according to ASTM D 1652.

Coating Preparation:

Amine-crosslinked and self-crosslinked coating formulations were made for coating performance study. Formulations were based on 60% solids (wt %). The solvents used for all the formulations were ethyl 3-ethoxy propionate (EEP) (20 wt %) and tertiary butyl acetate (TBA) (20 wt %). Two amine crosslinkers used were para aminocyclohexyl methane (PACM) and Ancamide 2353.

Amine:epoxy equivalent ratio was maintained to 1:1 in all the formulations. Film drawdowns were made on steel panels (smooth finished, Q panels) after degreasing the panels with p-xylene. Films were drawn at 8 mils using drawdown bar and kept at room temperature overnight. The next day, coated panels were placed in an oven at 80° C. for an hour. All the panels were kept at room temperature after curing and were tested the next day and after fourteen days. Amine-crosslinked ether alcohol modified BGC were tested after fourteen days.

For the self-crosslinked coatings, the coating film drawdowns were made in the same way as explained above. The curing of the coating films was carried out at 150° C. for 1 hr 45 min. Coatings were kept under ambient conditions for three days before their properties were evaluated.

Coating Performance:

Konig pendulum hardness was measured following ASTM D 4366, with the values reported in seconds(s). Coating reverse impact resistance was determined using ASTM D 2794 with a Gardener impact tester. The maximum drop height was 43 inch with a drop weight of four pounds. Crazing or loss of adhesion was noted and inch pounds were determined at film finish failure. Samples that did not fail were noted as >172 in-lbs. A conical mandrel test was also used to determine the flexibility of the coatings (ASTM D 522). Coatings that did not crack during the flexibility test were noted as pass, those that had any signs of defects were noted as fail. Methyl ethyl ketone (MEK) double rubs were used to assess the development of cure. A 26-ounce hammer with five-layers of cheesecloth wrapped around the hammerhead was soaked in MEK. After 100 double rubs the hammer was rewet with MEK. Once mar was achieved the number of double rubs was noted. The cross hatch adhesion of coating was evaluated using Gardco cross hatch adhesion instrument following ASTM D 3359. The gloss values were measured according to ASTM D 523.

TABLE 1

Viscosity of alcohol modified GC resins as made and reduced to 80% with t-BAc.

| Resin | As-made Viscosity (mPas) | Viscosity 80% solids in t-BAc (mPas) |
|---|---|---|
| BGC-BA | 566,000 | 8,120 |
| BGC-IBA | 1,364,500 | 9,552 |
| BGC-2EH | 1,002,666 | 11,173 |
| BGC | 3,209,666 | 23,290 |

The resins were crosslinked with either bis(p-amino cyclohexyl)methane (PACM) and a polyamide resin, Ancamide 2523 at a 1:1 stoichiometric ratio of epoxy groups to amine active hydrogens. All coatings were applied to xylene-washed smooth cold rolled steel panels.

The coatings properties are given in Tables 2 and 3 for the coatings after curing in an oven at 80° C. The coatings have good hardness, flexibility, gloss, and adhesion. The coatings based on the alcohol modified GC resins have improved flexibility over the control BGC resin.

TABLE 2

Properties of GC Resins crosslinked with PACM (1:1).

| GC Resin | Reverse Impact in-lb | Koning Hardness sec | MEK double rubs | Conical Mandrel cm | Cross hatch adhesion | Gloss 20° | Gloss 60° | Gloss 85° |
|---|---|---|---|---|---|---|---|---|
| BGC | 160 | 135 | >400 | 0 | 4B | 93 | 98 | 101 |
| BGC-BA | >172 | 70 | 280 | 0 | 5B | 88 | 137 | 98 |
| BGC-IBA | >172 | 61 | 230 | 0 | 5B | 117 | 146 | 101 |
| BGC-2EH | >172 | 63 | 150 | 0 | 5B | 125 | 149 | 102 |

Curing Conditions: Overnight at RT, then 60 min at 80° C.

TABLE 3

GC Resins crosslinked with Ancamide 2353 (1:1).

| GC Resin | Reverse Impact in-lb | Koning Hardness sec | MEK double rubs | Conical Mandrel cm | Cross hatch adhesion | Gloss 20° | Gloss 60° | Gloss 85° |
|---|---|---|---|---|---|---|---|---|
| BGC | 132 | 90 | >400 | 0 | 4B | 128 | 148 | 40 |
| BGC-BA | >172 | 56 | 150 | 0 | 5B | 127 | 152 | 102 |
| BGC-IBA | >172 | 64 | 170 | 0 | 5B | 128 | 144 | 101 |
| BGC-2EH | >172 | 81 | 160 | 0 | 5B | 117 | 148 | 99 |

Curing Conditions: Overnight at RT, then 90 min at 80° C.

After the coatings aged for an additional 13 days at ambient, the properties were measured again. The properties are listed in Tables 4 and 5. The coatings all maintained their good adhesion, hardness and gloss. Solvent resistance was improved, indicating that additional curing had occurred.

TABLE 4

GC Resins crosslinked with PACM (1:1).

| GC Resin | Reverse Impact in-lb | Koning Hardness sec | MEK double rubs | Conical Mandrel cm | Cross hatch adhesion | Gloss 20° | Gloss 60° | Gloss 85° |
|---|---|---|---|---|---|---|---|---|
| BGC | 116 | 168 | >500 | 0 | 5B | 77 | 120 | 96 |
| BGC-BA | 116 | 134 | >500 | 0 | 3B | 89 | 134 | 96 |

TABLE 4-continued

GC Resins crosslinked with PACM (1:1).

| GC Resin | Reverse Impact in-lb | Koning Hardness sec | MEK double rubs | Conical Mandrel cm | Cross hatch adhesion | Gloss 20° | 60° | 85° |
|---|---|---|---|---|---|---|---|---|
| BGC-IBA | 140 | 134 | >500 | 0 | 3B | 125 | 148 | 99 |
| BGC-2EH | 128 | 130 | >500 | 0 | 4B | 122 | 147 | 99 |

Curing Conditions: Overnight at RT, then 60 min at 80° C. plus 13 days ambient.

TABLE 5

GC Resins crosslinked with Ancamide 2353 (1:1).

| GC Resin | Reverse Impact in-lb | Koning Hardness sec | MEK double rubs | Conical Mandrel cm | Cross hatch adhesion | Gloss 20° | 60° | 85° |
|---|---|---|---|---|---|---|---|---|
| BGC | 36 | 121 | >500 | 0 | 0B | 127 | 148 | 99 |
| BGC-BA | 28 | 146 | >500 | 0 | 4B | 79 | 120 | 81 |
| BGC-IBA | 88 | 90 | >500 | 0 | 1B | 126 | 148 | 99 |
| BGC-2EH | 44 | 102 | >500 | 0 | 2B | 114 | 141 | 98 |

Curing Conditions: Overnight at RT, then 90 min at 80° C. plus 13 days ambient.

TABLE 6

Viscosity of ether alcohol modified BGC resins as-made (~100% solids) and reduced to 80% in t-BAc.

| | As-made | | 80% Solids in t-BAc | |
|---|---|---|---|---|
| Resin | Viscosity (mPa · s) | Viscosity rel. to BGC, % | Viscosity (mPa · s) | Viscosity rel. to BGC, % |
| BGC | 5,430,000 | — | 174,000 | — |
| BGC-EB | 1,350,000 | 25 | 20,240 | 12 |
| BGC-EP | 698,000 | 13 | 17,040 | 10 |
| BGC-DB | 475,000 | 9 | 9520 | 5.5 |

Similarly, the ether alcohol modified resins (Table 6) were crosslinked with PACM and Ancamide crosslinkers and allowed to cure under ambient conditions for almost two weeks before determination of physical properties. As seen in Tables 7 and 8, the coatings based on the ether alcohol modified resins have good solvent resistance, adhesion, and gloss. The flexibility of the ether alcohol resins is improved over that of the control BGC resin, while the hardness is lower.

TABLE 7

PACM crosslinked ether alcohol modified BGC Resins

| GC Resin | Reverse Impact in · lb | Koning Hardness sec | MEK double rubs | Conical Mandrel cm | Cross hatch adhesion | Gloss 20° | 60° | 85° |
|---|---|---|---|---|---|---|---|---|
| BGC | 116 | 168 | >400 | 0 | 5B | 77 | 120 | 96 |
| BGC EB | >172 | 85 | >400 | 0 | 5B | 125 | 149 | 100 |
| BGC DB | >172 | 78 | >400 | 0 | 5B | 102 | 142 | 98 |
| BGC EP | >172 | 82 | >400 | 0 | 5B | 123 | 148 | 100 |

Curing Condition: 1 hr at 80° C. and kept at room temperature for 13 days before tests were carried out
Formulation: (1:1 = BGC:PACM), 20% tert butyl acetate (TBA), 20% ethyl 3 ethoxy propionate (EEP), induction time before film drawdown: 15-20 min (Bubbles appearing during mixing disappeared during this time)

TABLE 8

Ancamide 2353 crosslinked ether alcohol modified BGC Resins

| GC Resin | Reverse Impact in · lb | Koning Hardness sec | MEK double rubs | Conical Mandrel cm | Cross hatch adhesion | Gloss 20° | 60° | 85° |
|---|---|---|---|---|---|---|---|---|
| BGC | 36 | 121 | >400 | 0 | 0B | 127 | 148 | 99 |
| BGC EB | >172 | 70 | >400 | 0 | 4B | 131 | 150 | 97 |

TABLE 8-continued

Ancamide 2353 crosslinked ether alcohol modified BGC Resins

| GC Resin | Reverse Impact in · lb | Koning Hardness sec | MEK double rubs | Conical Mandrel cm | Cross hatch adhesion | Gloss 20° | 60° | 85° |
|---|---|---|---|---|---|---|---|---|
| BGC DB | >172 | 53 | >400 | 0 | 4B | 128 | 149 | 96 |
| BGC EP | >172 | 51 | >400 | 0 | 4B | 126 | 149 | 95 |

Curing Condition: 1 hr at 80° C. and kept at room temperature for 13 days before tests were carried out
Formulation: (1:1 = BGC:Ancamide 2353), 20% tert butyl acetate (TBA), 20% ethyl 3 ethoxy propionate (EEP), induction time before film drawdown: 15-20 min (Bubbles appearing during mixing disappeared during this time)

Self-Crosslinking of Alcohol-Modified GC Resins

The alcohol and ether alcohol modified BGC resins were self crosslinked at 150° C. Coating properties are shown in Tables 9 and 10. All of the self-crosslinked coatings had good gloss and excellent adhesion. Flexibility of the coatings was good, with the ether alcohol modified resins yielding better flexibility than the alcohol modified resins.

TABLE 9

Properties of self-crosslinked alcohol modified BGC resins.

| GC Resin | Reverse Impact in.lb | Koning Hardness sec | MEK double rubs | Conical Mandrel cm | Cross hatch adhesion | Gloss 20° | 60° | 85° |
|---|---|---|---|---|---|---|---|---|
| BGC | >172 | 193 | >400 | 0 | 5B | 112 | 141 | 93 |
| BGC 1 BA | >172 | 71 | 150 | 0 | 5B | 99 | 127 | 85 |
| BGC IBA | 72 | 134 | 100 | 0 | 5B | 118 | 144 | 96 |
| BGC 2EH | >172 | 41 | 95 | 0 | 5B | 120 | 145 | 97 |

Curing condition: Coatings on Q panels kept over night at room temperature and the next day all the formulations were cured at 150° C. for 1 hr and 45 min. Coatings kept overnight after oven curing and properties checked after three days.
Formulation: 20% TBA and 20% EEP, film drawdown at 8 mils, steel panel (Smooth finish Q panels) washed with xylene.

TABLE 10

Properties of self-crosslinked ether alcohol modified BGC resins.

| GC Resin | Reverse Impact in.lb | Koning Hardness sec | MEK double rubs | Conical Mandrel cm | Cross hatch adhesion | Gloss 20° | 60° | 85° |
|---|---|---|---|---|---|---|---|---|
| BGC | 148 | 175 | >400 | 0 | 5B | 103 | 140 | 93 |
| BGC EB | >172 | 46 | 150 | 0 | 5B | 119 | 145 | 99 |
| BGC DB | >172 | 24 | 110 | 0 | 5B | 93 | 126 | 87 |
| BGC EP | >172 | 61 | 120 | 0 | 5B | 120 | 145 | 97 |

Curing condition and formulation: All the formulation, drawdown and curing conditions were the same as that for alcohol modified BGC self crosslinked coatings except BGC kept for 1 hr at 150° C.
Both the formulations kept at room temperature for 20 min after solvent mixing. Film drawdowns were taken after this time.

The experiments above demonstrate that substituting approx. ⅓ of the glycidol with an alcohol in the BCG resin resulted in a significant reduction in viscosity and an increase in the flexibility of amine crosslinked coatings.

Next, a series of alcohol-modified BGC resins were synthesized with a range of alcohol substitution to determine the effect of the level of alcohol substitution on viscosity and performance properties. Since the base isocyanate polymer is only about 50% of the trifunctional species with additional higher functionality oligomers, BCG resins having a greater than ⅓ substitution of glycidol were analyzed.

A series of BGC-EP resins were synthesized with a range of EP (ethylene glycol propyl ether) substitution for the glycidol. The epoxy equivalent weight increases systematically, as expected. See Table 3. The viscosity of the resins also decreases as the amount of alcohol modification increases. See FIG. 1.

TABLE 11

Epoxy equivalent weight of alcohol modified BGC resins.

| Resin | EEW (gm/eq) | Visc (mPa · s) |
|---|---|---|
| BGC | 265 | 3,500,000 |
| BGC-EP 15% | 336 | 1,300,000 |
| BGC-EP 25% | 330 | 808,000 |

TABLE 11-continued

Epoxy equivalent weight of alcohol modified BGC resins.

| Resin | EEW (gm/eq) | Visc (mPa · s) |
|---|---|---|
| BGC-EP 33% | 355 | 455,000 |
| BGC-EP 40% | 380 | 434,000 |
| BGC-EP 45% | 465 | 430,000 |

Coatings were prepared from these resins using two different amine crosslinkers: PACM (p-aminocyclomethane) and Ancamide 2353, a polyamide resin. Epoxy-to-amine active hydrogen ratio was 1:1. The coatings were drawn down on cleaned, untreated steel panels and cured in an oven at 80° C. for 1 hour. Coatings properties are provided in Tables 12 and 13.

TABLE 12

Performance of BGC-EP resins crosslinked with PACM.

| GC Resin | Reverse Impact in.lb | König Hardness Sec | MEK double rubs | Conical Mandrel cm | Cross hatch adhesion | Gloss 20° | Gloss 60° | Gloss 85° |
|---|---|---|---|---|---|---|---|---|
| BGC | 116 (t = 80) | 168 (t = 78) | >400 (t = 25) | 0 (t = 90) | 5B (t = 80) | 77 | 120 | 96 |
| BGC-EP 15% | 104 (t = 75) | 120 (t = 76) | >400 (t = 85) | 0 (t = 76) | 5B (t = 80) | 123 | 160 | 108 |
| BGC-EP 25% | 112 (t = 61) | 130 (t = 66) | >400 (t = 69) | 0 (t = 66) | 5B (t = 80) | 58 | 160 | 112 |
| BGC-EP 33% | >172 (t = 44) | 82 (t = 44) | >400 (t = 30) | 0 (t = 38) | 5B (t = 77) | 123 | 148 | 100 |
| BGC-EP 40% | >172 (t = 75) | 81 (t = 69) | 80 (t = 69) | 0 (t = 69) | 5B (t = 77) | 162 | 164 | 115 |
| BGC-EP 45% | >172 (t = 76) | 68 (t = 70) | 35 (t = 74) | 0 (t = 70) | 5B (t = 81) | 151 | 170 | 103 | t = average film thickness in μm, gloss taken on glass panels, other tests carried out on smooth finished steel panels (Q panel, type QD)

TABLE 13

Performance of BGC-EP crosslinked with Ancamide 2353.

| GC Resin | Reverse Impact in.lb | König Hardness Sec | MEK double rubs | Conical Mandrel cm | Cross hatch adhesion | Gloss 20° | Gloss 60° | Gloss 85° |
|---|---|---|---|---|---|---|---|---|
| BGC | 36 (t = 63) | 121 (t = 63) | >400 (t = 63) | 0 (t = 34) | 0B (t = 63) | 127 | 148 | 99 |
| BGC-EP 15% | 120 (t = 75) | 78 (t = 76) | >400 (t = 85) | 0 (t = 76) | 5B (t = 80) | 166 | 167 | 117 |
| BGC-EP 25% | >172 (t = 61) | 71 (t = 66) | 280 (t = 69) | 0 (t = 66) | 5B (t = 80) | 163 | 166 | 115 |
| BGC-EP 33% | >172 (t = 44) | 51 (t = 44) | >400 (t = 46) | 0 (t = 49) | 4B (t = 44) | 126 | 149 | 95 |
| BGC-EP 40% | >172 (t = 75) | 46 (t = 69) | 50 (t = 69) | 0 (t = 69) | 5B (t = 77) | 166 | 114 | 115 |
| BGC-EP 45% | >172 (t = 76) | 44 (t = 70) | 35 (t = 74) | 0 (t = 70) | 5B (t = 81) | 156 | 152 | 114 | t = average film thickness in μm, gloss taken on glass panels, other tests carried out on smooth finished steel panels (Q panel, type QD).

For both crosslinkers, the flexibility of the coatings increases with increasing alcohol substitution. In addition, hardness systematically decreases. Conical mandrel flexibility is good for all of the coatings. MEK double rubs remain high until 33% substitution is exceeded and then declines; this result is consistent with a significant fraction of GC molecules being less than difunctional and not forming a good network.

Figure 2:
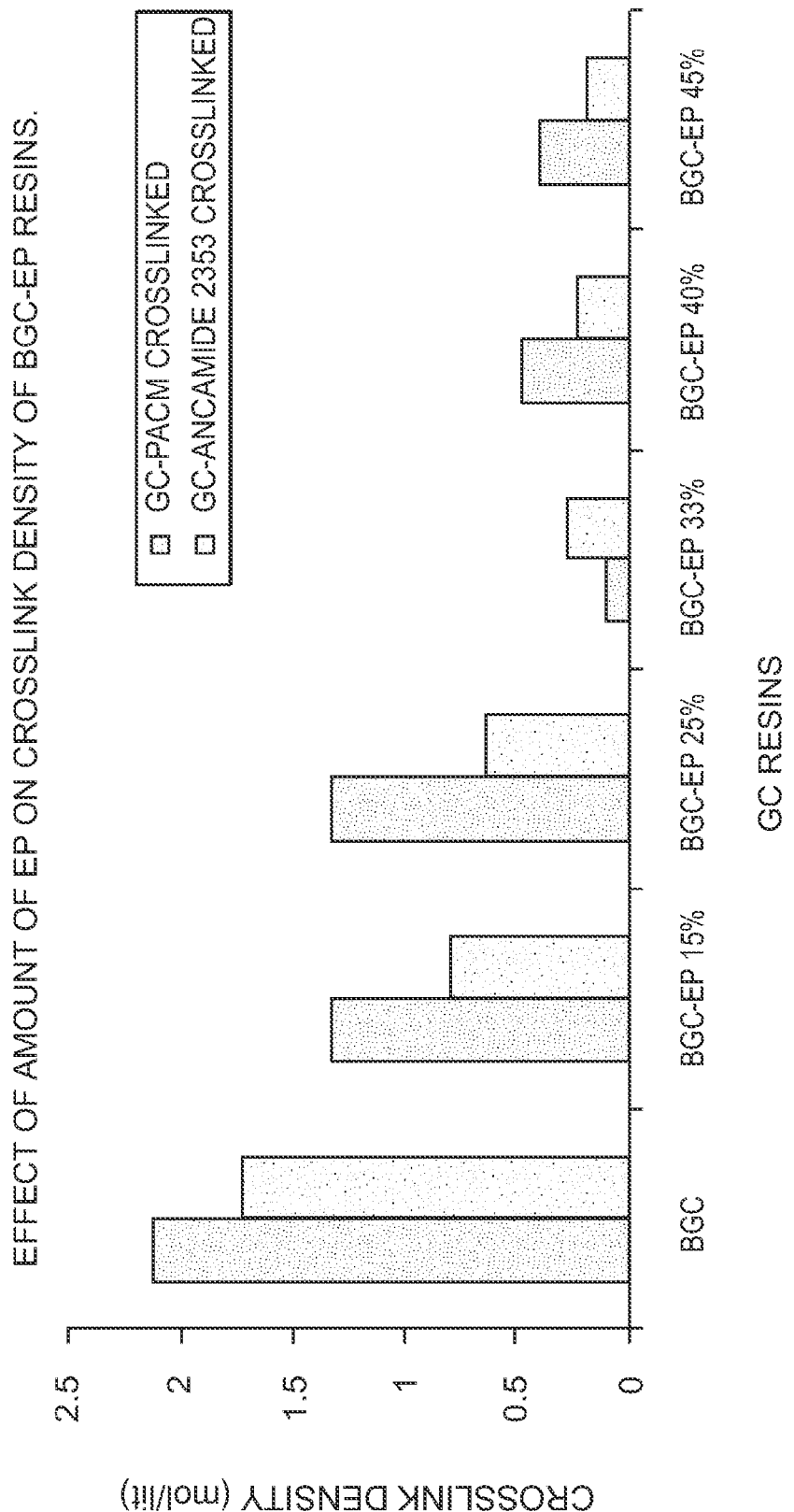
FIG. 2 is a chart depicting the crosslink density of various glycidyl carbamate resins.

The coatings were also analyzed using dynamic mechanical thermal analysis (DMTA), differential scanning calorimetry (DSC), and thermogravimetric analysis (TGA). DMTA data was used to determine the crosslink density and the results are plotted in FIG. 2. The crosslink density systematically decreases with the decrease in epoxy functionality of the resins, as expected.

DSC $T_g$ values of the coatings are shown in Table 14. The $T_g$ decreases systematically as the functionality of the GC resins decreases. This is believed to be caused by both the decreasing crosslink density and the decrease in crosslinker content in the coatings.

Figure 3:
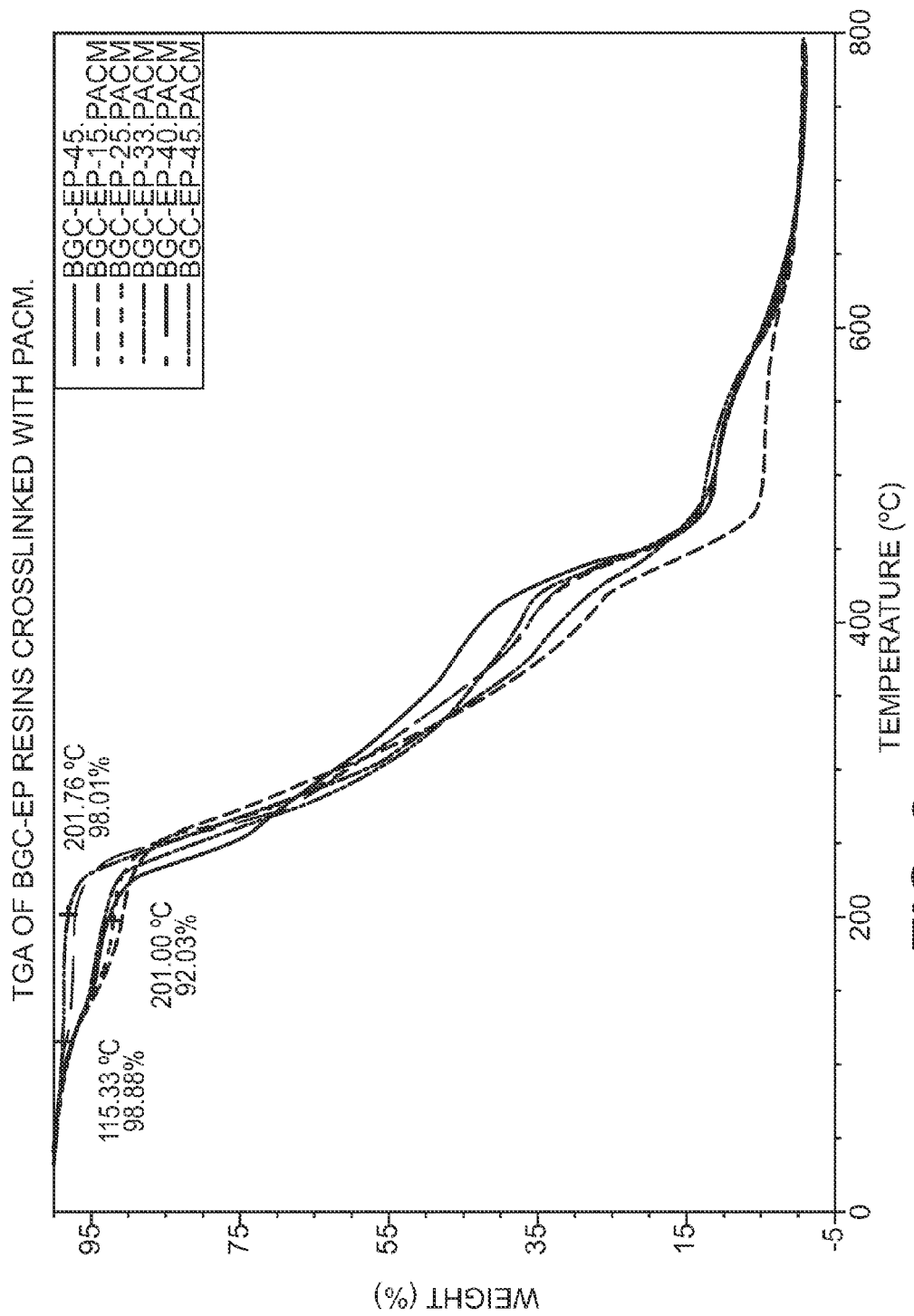
FIG. 3 is a chart depicting the TGA curves of various glycidyl carbamate resins crosslinked with PACM.
Figure 4:
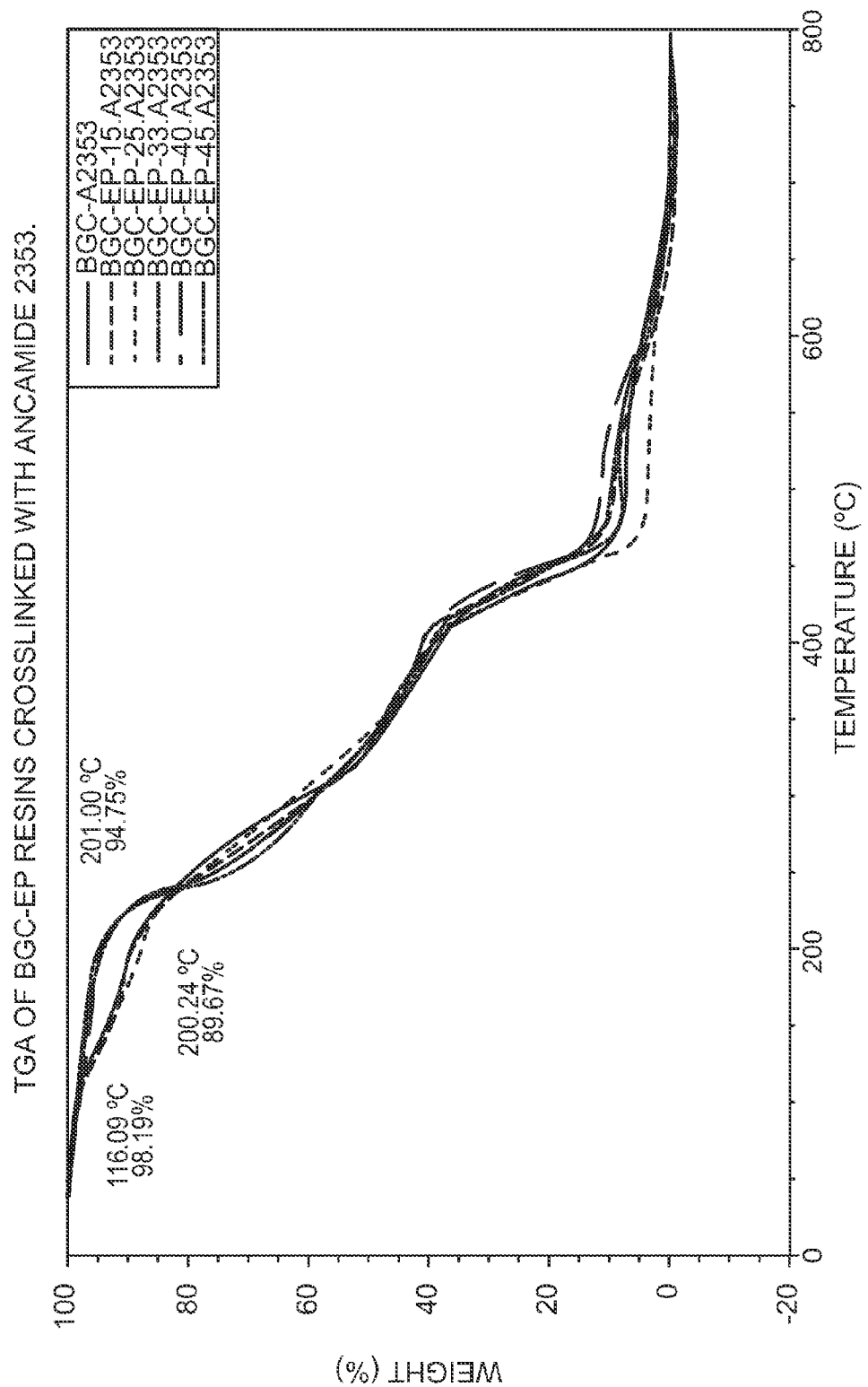
FIG. 4 is a chart depicting the TGA curves of various glycidyl carbamate resins crosslinked with Ancamide 2353.

The TGA data for the coatings is shown in FIGS. 3 and 4. These studies show that the coatings with the lowest crosslink density have the best thermal stability.

TABLE 14

DSC $T_g$ of BGC-EP coatings.

| BGC-EP Coatings | $T_g$ (° C.) | |
|---|---|---|
|  | PACM | A-2353 |
| BGC | 85 | 55 |
| BGC-EP 15% | 71 | 49 |

TABLE 14-continued

DSC $T_g$ of BGC-EP coatings.

| BGC-EP Coatings | $T_g$ (° C.) | |
|---|---|---|
| | PACM | A-2353 |
| BGC-EP 25% | 65 | 34 |
| BGC-EP 33% | 55 | 40 |
| BGC-EP 40% | 36 | 22 |
| BGC-EP 45% | 34 | 22 |

The claimed invention is:

1. A solvent-based coating composition comprising an alcohol-modified glycidyl carbamate compound of formula (I), (II), (III), or (IV):

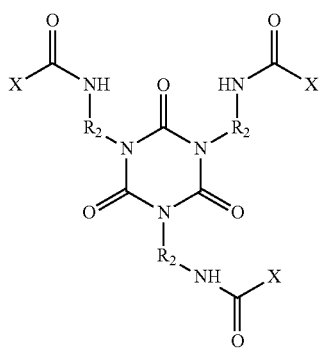
(I)

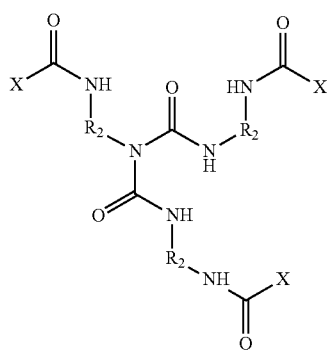
(II)

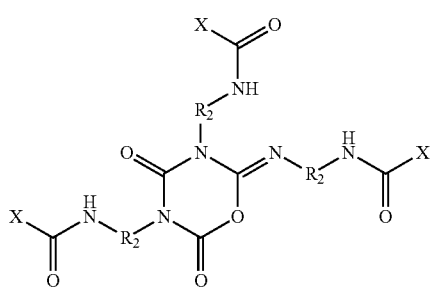
(III)

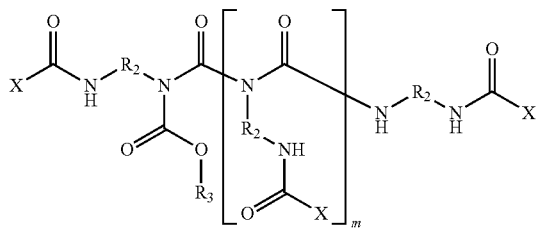
(IV)

wherein:

R2 is independently an optionally substituted, divalent C1-C15 alkyl, an optionally substituted divalent C3-C15 cycloalkyl, or a divalent substituent selected from the group consisting of

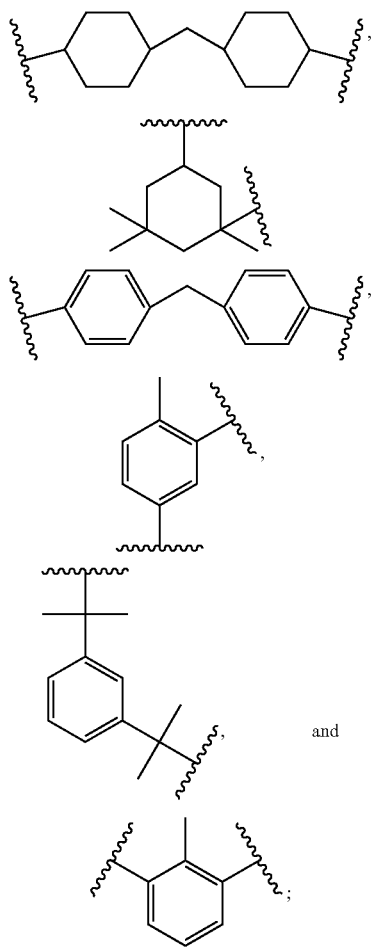

and

X represents either the glycidyl group:

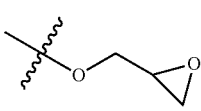 [SMILES: *OCC1CO1]

or an alkyl group based on an alcohol, represented as:

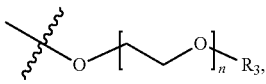

wherein at least two of the X moieties are represented by the glycidyl group;
n ranges from 1-50;
m ranges from 1-15; and
R3 is independently an optionally substituted C1-C22 alkyl.

2. The coating composition of claim 1, wherein R2 is a divalent C3-C8 alkyl.

3. The coating composition of claim 1, wherein R3 is a C1-C6 alkyl.

4. The coating composition of claim 3, wherein R2 is —(CH2)6- and R3 is a C1-C3 alkyl.

5. The coating composition of claim 1, wherein R3 is a C3-C10 alkyl.

6. The coating composition of claim 1, wherein R2 is —(CH2)6- and R3 is a C4-C8 alkyl.

7. The coating composition of claim 1, wherein the compound is represented by formula (I) or (II).

8. The coating composition of claim 1, wherein the compound is represented by formula (IV).

9. The coating composition of claim 1, wherein m ranges from 1-4.

10. The coating composition of claim 1, further comprising one or more curing agents, optionally other glycidyl carbamate-functional compounds, optionally one or more organic solvents, and optionally one or more coating additives.

11. The coating composition of claim 10, wherein the curing agent is an amine curing agent.

12. The coating composition of claim 11, wherein the amine curing agent is bis(paraaminocyclohexyl)methane (PACM), a polyamine, or combinations thereof.

13. A method of coating a substrate with a solvent-based coating composition, comprising the step of applying the coating composition of claim 1 to a substrate.

14. The method of claim 13, wherein the substrate is selected from the group consisting of wood, steel, aluminum, plastic, and glass.

15. The method of claim 13, wherein the coating composition comprises at least one curing agent, optionally other glycidyl carbamate-functional compounds, optionally one or more organic solvents, and optionally one or more coating additives.

* * * * *